(12) United States Patent
Bae et al.

(10) Patent No.: US 10,181,756 B2
(45) Date of Patent: Jan. 15, 2019

(54) WIRELESS POWER TRANSMITTER AND POWER TRANSMISSION METHOD THEREOF

(71) Applicant: LG INNOTEK CO., LTD., Seoul (KR)

(72) Inventors: Su Ho Bae, Seoul (KR); Ki Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/133,670

(22) Filed: Apr. 20, 2016

(65) Prior Publication Data

US 2016/0233724 A1 Aug. 11, 2016

Related U.S. Application Data

(63) Continuation of application No. 13/663,995, filed on Oct. 30, 2012.

(30) Foreign Application Priority Data

Nov. 2, 2011 (KR) .................. 10-2011-0113288

(51) Int. Cl.
*H02J 50/12* (2016.01)
*H02J 50/40* (2016.01)
(Continued)

(52) U.S. Cl.
CPC .............. *H02J 50/12* (2016.02); *H02J 50/40* (2016.02); *H02J 50/90* (2016.02); *H04B 5/0037* (2013.01); *H04B 5/0087* (2013.01)

(58) Field of Classification Search
CPC ........ H02J 50/12; H02J 50/90; H04B 5/0037; H04B 5/0087
See application file for complete search history.

(56) References Cited

U.S. PATENT DOCUMENTS 5,311,973 A * 5/1994 Tseng .................... B60L 11/182
191/10
8,587,154 B2 11/2013 Fells et al.
(Continued)

FOREIGN PATENT DOCUMENTS

CN 101399464 A 4/2009
CN 101951036 A 1/2011
(Continued)

OTHER PUBLICATIONS

Office Action dated Dec. 26, 2012 in Korean Application No. 10-2011-0113288.
(Continued)

*Primary Examiner* — Carlos Amaya
*Assistant Examiner* — James Evans
(74) *Attorney, Agent, or Firm* — Saliwanchik, Lloyd & Eisenschenk

(57) ABSTRACT

Disclosed are a wireless power transmitter and a power transmission method thereof. The wireless power transmitter includes a plurality of transmission resonance units, a detection power applying unit applying detection power to the transmission resonance units to detect a location of the wireless power receiver, and a current measuring unit measuring current generating from an inner part of the wireless power transmitter based on the applied detection power. The wireless power transmitter transmits the power through at least one transmitting resonance unit corresponding to the location of the wireless power receiver based on the measured current.

10 Claims, 4 Drawing Sheets

(51) Int. Cl.
*H02J 50/90* (2016.01)
*H04B 5/00* (2006.01)

(56) References Cited

U.S. PATENT DOCUMENTS

| | | | |
|---|---|---|---|
| 10,033,224 B2* | 7/2018 | Bae | H04B 5/0037 |
| 2004/0130916 A1 | 7/2004 | Baarman | |
| 2006/0202665 A1 | 9/2006 | Hsu | |
| 2008/0157603 A1* | 7/2008 | Baarman | H02J 7/025 |
| | | | 307/104 |
| 2009/0079271 A1 | 3/2009 | Jin | |
| 2009/0096413 A1 | 4/2009 | Partovi et al. | |
| 2009/0133942 A1* | 5/2009 | Iisaka | H02J 7/025 |
| | | | 178/43 |
| 2010/0052431 A1 | 3/2010 | Mita | |
| 2010/0256831 A1 | 10/2010 | Abramo et al. | |
| 2010/0264747 A1* | 10/2010 | Hall | B60L 11/182 |
| | | | 307/104 |
| 2011/0101791 A1 | 5/2011 | Urano | |
| 2011/0109263 A1 | 5/2011 | Sakoda et al. | |
| 2011/0221388 A1 | 9/2011 | Low et al. | |
| 2011/0241435 A1 | 10/2011 | Saito | |
| 2012/0049642 A1* | 3/2012 | Kim | H02J 5/005 |
| | | | 307/104 |
| 2012/0161530 A1 | 6/2012 | Urano | |
| 2012/0217818 A1* | 8/2012 | Yerazunis | H02J 5/005 |
| | | | 307/104 |

FOREIGN PATENT DOCUMENTS

| | | | |
|---|---|---|---|
| CN | 102055249 A | 5/2011 | |
| CN | 102055250 A | 5/2011 | |
| JP | 2005210801 A | 8/2005 | |
| JP | 2006149168 A | 6/2006 | |
| JP | 2009271846 A | 11/2009 | |
| JP | 2010527226 A | 8/2010 | |
| JP | 2010200497 A | 9/2010 | |
| JP | 2011-125137 A | 6/2011 | |
| JP | 2011151989 A | 8/2011 | |
| JP | 2011199975 A | 10/2011 | |
| KR | 20100026075 A | 3/2010 | |
| KR | 10-2010-0047303 A | 5/2010 | |
| KR | 1020100128395 A | 12/2010 | |
| TW | 200937795 A | 9/2009 | |
| TW | 200943664 A | 10/2009 | |
| TW | 201103224 A | 1/2011 | |
| WO | WO-2006058309 A2 | 6/2006 | |
| WO | WO-2008050260 A1 | 5/2008 | |
| WO | WO-2008050292 A2 | 5/2008 | |

OTHER PUBLICATIONS

European Search Report dated Mar. 18, 2013 in European Application No. 12191056.6.
Notice of Allowance dated Nov. 29, 2013 in Korean Application No. 10-2011-0113288.
Office Action dated Jun. 12, 2014 in Chinese Application No. 201210433538.2.
Office Action dated Jun. 24, 2014 in Taiwanese Application No. 101140334.
Office Action dated Jan. 25, 2016 in Taiwanese Application No. 104114996.
Office Action dated Aug. 21, 2015 in U.S. Appl. No. 13/663,995.
Office Action dated Feb. 18, 2016 in U.S. Appl. No. 13/663,995.
Office Action dated Jun. 10, 2016 in Japanese Application No. 2012-236340.
Office Action dated Feb. 7, 2017 in Japanese Application No. 2012236390.
Office Action dated Feb. 22, 2017 in U.S. Appl. No. 13/663,995.
Office Action dated Jan. 11, 2017 in Korean Application No. 1020130096289.
Office Action dated Jul. 27, 2017 in U.S. Appl. No. 13/663,995.
Office Action dated Sep. 5, 2017 in Japanese Application No. 2012-236340.
Office Action dated Oct. 12, 2017 in Korean Application No. 10-2013-0096289.

\* cited by examiner

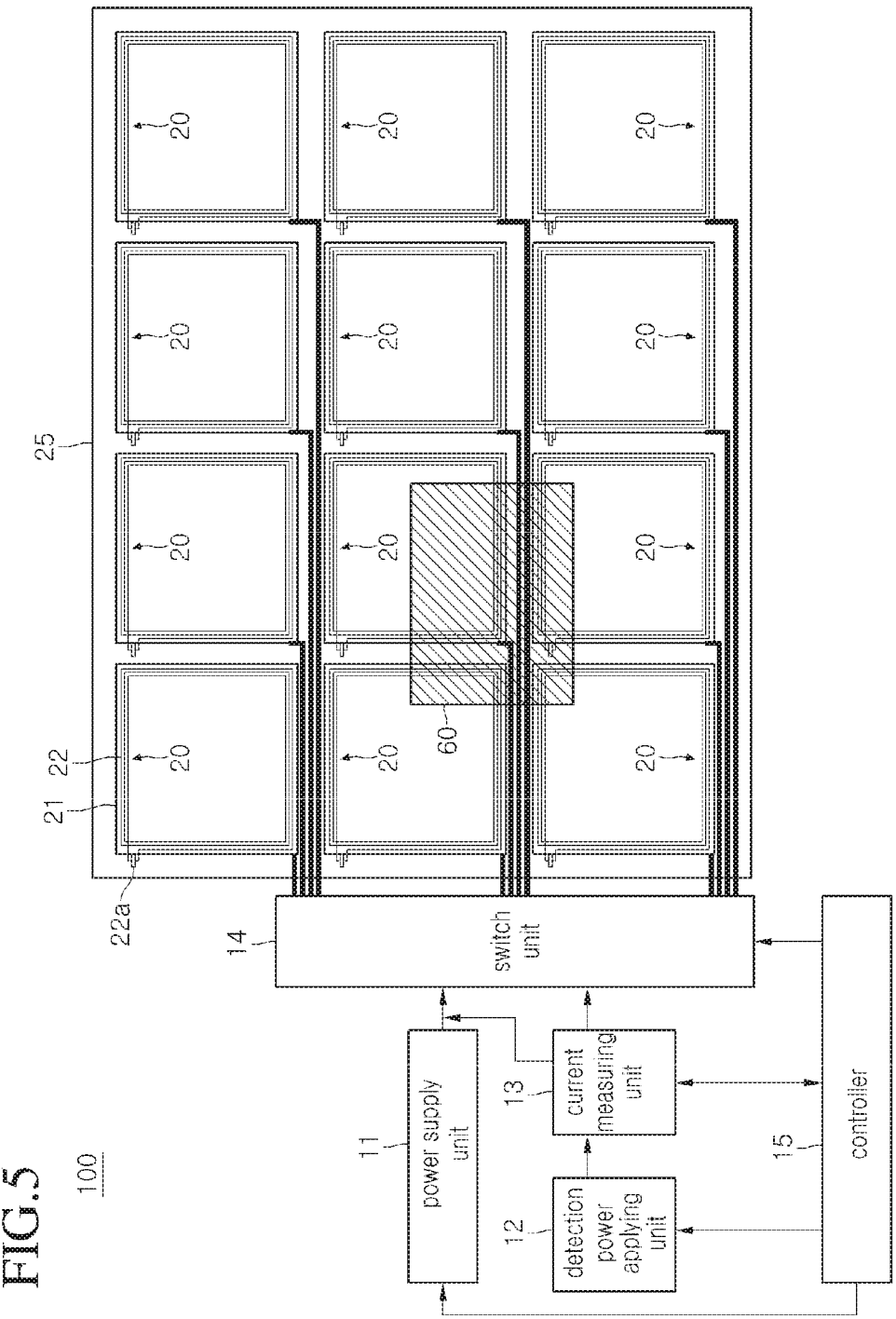

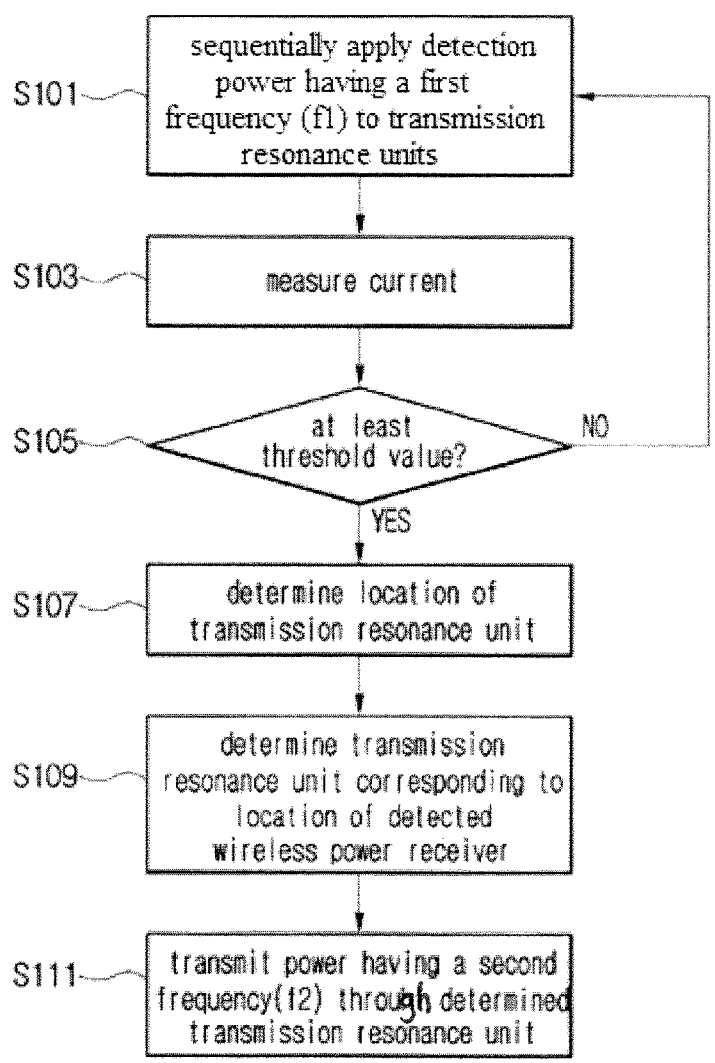

WIRELESS POWER TRANSMITTER AND POWER TRANSMISSION METHOD THEREOF

CROSS-REFERENCE TO RELATED APPLICATION

This application is a continuation of U.S. application Ser. No. 13/663,995, filed Oct. 30, 2012, which claims priority to Korean Patent Application No. 10-2011-0113288, filed Nov. 2, 2011, which are herein incorporated by reference in their entirety.

BACKGROUND

The disclosure relates to a wireless power transmission technology. In more particular, the disclosure relates to a wireless power transmitter capable of effectively transmitting energy by using a resonance phenomenon and a power transmission method thereof.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

In the case of a short-distance wireless power transmission, which has been spotlighted in these days, a wireless power transmitter is installed in a building in such a manner that a mobile device, such as a cellular phone or a notebook computer, can be continuously charged when a user uses the mobile device in the building even if the mobile device is not connected to an additional power cable.

However, according to the wireless power transmission technology of the related art, power must be constantly transmitted regardless of the existence of the wireless power receiver that receives the power, causing the waste of the power and damage to the human body.

BRIEF SUMMARY

The disclosure provides a wireless power transmitter capable of transmitting energy by using a resonance phenomenon and a method thereof.

In addition, the disclosure provides a wireless power transmitter capable of detecting the location of a wireless power receiver and a method thereof.

Further, the disclosure provides a wireless power transmitter capable of transmitting energy through a specific transmission resonance unit corresponding to the location of the wireless power receiver and a method thereof.

According to the embodiment, there is provided a wireless power transmitter for wirelessly transmitting power to a wireless power receiver by using resonance. The wireless power transmitter includes a plurality of transmission resonance units, a detection power applying unit applying detection power to the transmission resonance units to detect a location of the wireless power receiver, and a current measuring unit measuring current generating from an inner part of the wireless power transmitter based on the applied detection power. The wireless power transmitter transmits the power through at least one transmitting resonance unit corresponding to the location of the wireless power receiver based on the measured current.

According to the embodiment, there is provided a power transmission method of a wireless power transmitter for wirelessly transmitting power to a wireless power receiver by using resonance. The power transmission method includes applying detection power to a plurality of transmission resonance units, measuring current generated from an inner part of the wireless power transmitter based on the detection power, determining at least one transmission resonance unit corresponding to a location of the wireless power receiver based on the measured current, and transmitting the power through the at least one transmission resonance unit that has been determined.

According to the embodiment of the disclosure, the wireless power transmitter transmits energy through the transmission resonance unit corresponding to the location of the wireless power receiver, thereby improving the power transmission efficiency.

In addition, the wireless power transmitter concentrates the energy transmission through the specific transmission resonance unit, so that the energy can be inhibited from being wasted, and the magnetic field harmful to the human body can be reduced.

Meanwhile, other various effects may be directly or indirectly disclosed in the following description of the embodiment of the disclosure.

BRIEF DESCRIPTION OF THE DRAWINGS

FIG. 5 is a view showing the structure of a wireless power transmitter according to one embodiment of the disclosure; and FIG. 6 is a flowchart showing a method of transmitting power according to one embodiment of the disclosure.

DETAILED DESCRIPTION

In the following description, if detailed description about well-known functions or configurations may make the subject matter of the disclosure unclear, the detailed description will be omitted. In addition, terminologies to be described are defined based on functions of components according to the embodiment, and may have meanings varying according to the intentions of a user or an operator and customers. Accordingly, the terminologies should be defined based on the whole context throughout the present specification.

Hereinafter, the embodiment will be described with reference to accompanying drawings.

Figure 1:
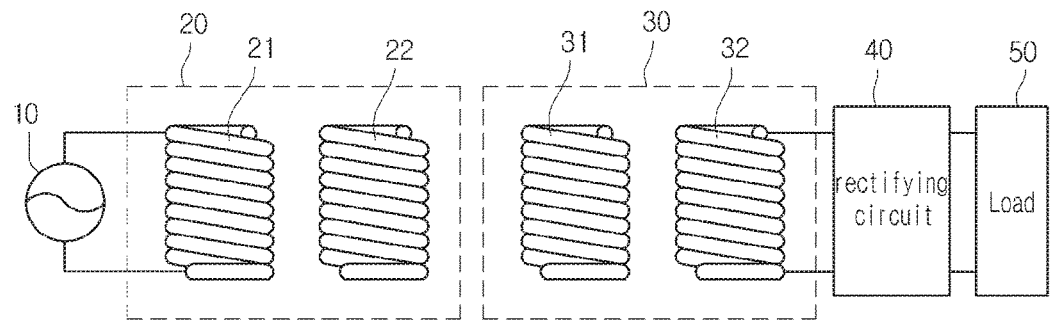
FIG. 1 is a view showing a wireless power transmission system according to one embodiment of the disclosure.

FIG. 1 is a view showing a wireless power transmission system according to the embodiment.

Referring to FIG. 1, the wireless power transmission system includes a power source 10, a power transmission unit 20, a power reception unit 30, a rectifying circuit 40 and a load 50.

The power generated from the power source 10 is provided to the power transmission unit 20, such that the power transmission unit 20 transmits the power using resonance to the power reception unit 30, which is resonant with the power transmission unit 20 and has the same resonant frequency value as that of the power transmission unit 20. The power transferred to the power reception unit 30 is transferred via the rectifying circuit 40 to the load 50. The load 50 may be a battery or a predetermined apparatus which needs power.

In detail, the power source 10 is an AC power source for supplying AC power of a predetermined frequency.

The power transmission unit 20 includes a transmission coil unit 21 and a transmission resonant coil unit 22. The transmission coil unit 21 is connected to the power source 10, such that an AC current flows through the transmission coil unit 21. When AC current flows through the transmission coil unit 21, the AC current is induced to the transmission resonant coil unit 22 physically spaced apart from the transmission coil unit 21 due to electromagnetic induction. The power transferred to the transmission resonant coil unit 22 is transmitted using resonance to the power reception unit 30 which forms a resonance circuit with the power transmission unit 20.

According to the power transmission using resonance, the power can be transmitted between two LC circuits which are impedance-matched with each other. The power transmission scheme using the resonance can transmit the power farther than the power transmission scheme using the electromagnetic induction with the higher power transmission efficiency.

The power reception unit 30 includes a reception resonant coil unit 31 and a reception coil unit 32. The power transmitted from the transmission resonant coil unit 22 is received in the reception resonant coil unit 31, so that the AC current flows through the reception resonant coil unit 31. The power transmitted to the reception resonant coil unit 31 is transferred by electromagnetic induction to the reception coil unit 32. The power transferred to the reception coil 32 is transferred through the rectifier circuit 40 to the load 50.

Figure 2:
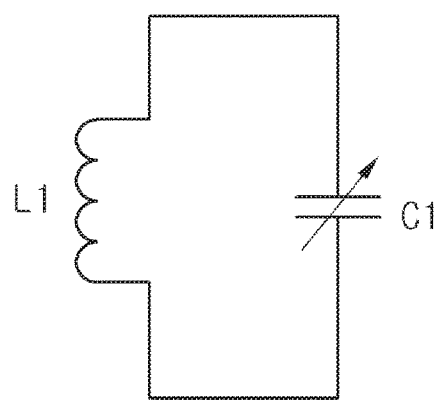
FIG. 2 is a circuit diagram showing an equivalent circuit of a transmission coil unit according to one embodiment of the disclosure.

FIG. 2 is an equivalent circuit diagram of the transmission coil unit 21 according to the embodiment. As shown in FIG. 2, the transmission coil unit 21 may include an inductor L1 and a capacitor C1, and form a circuit having a suitable inductance value and a suitable capacitance value.

The capacitor C1 may be a fixed capacitor or a variable capacitor. When the capacitor C1 is the variable capacitor, the power transmission unit 20 may control the variable capacitor for an impedance matching. Meanwhile, equivalent circuits of the transmission resonant coil unit 22, the reception resonant coil unit 31, and the reception coil unit 32 may be equal to that depicted in FIG. 2.

Figure 3:
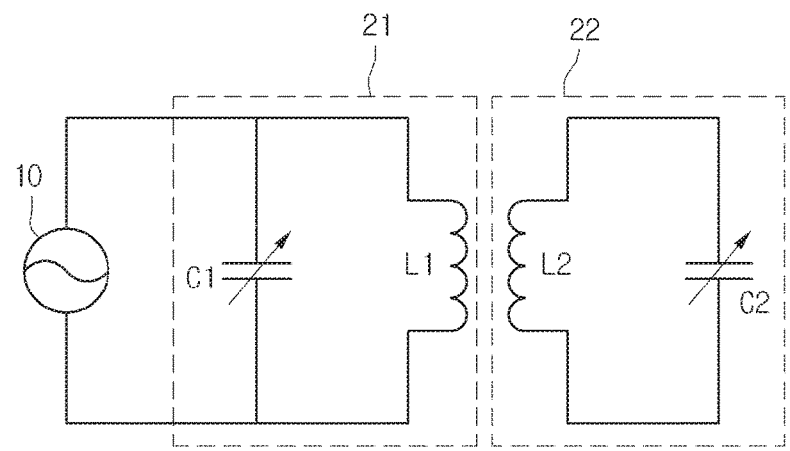
FIG. 3 is a circuit diagram showing an equivalent circuit of a power source and a transmitting unit according to one embodiment.

FIG. 3 is an equivalent circuit diagram of the power source 10 and the power transmission unit 20 according to the embodiment. As shown in FIG. 3, each of the transmission coil unit 21 and the transmission resonance coil part 22 may include an inductor L1 or L2 and a capacitor C1 or C2 having a predetermined inductance value and a predetermined capacitance value, respectively.

Especially, the capacitor C2 of the transmission resonant coil unit 22 may be a variable capacitor, and the power transmission unit 20 may adjust the variable capacitor to adjust a resonant frequency value for resonance.

Figure 4:
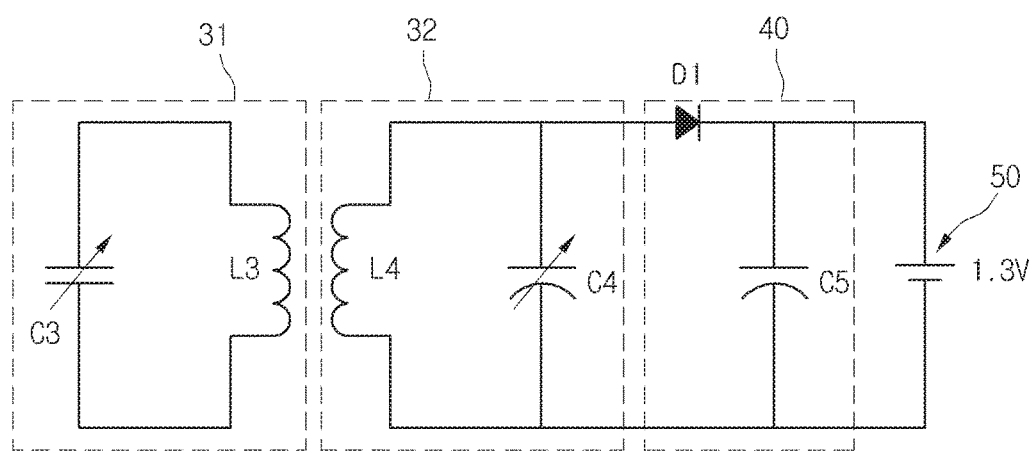
FIG. 4 is a circuit diagram showing an equivalent circuit of a reception resonant coil, a reception coil unit, a smoothing circuit, and a load according to one embodiment of the disclosure.

FIG. 4 is an equivalent circuit diagram of the reception resonant coil unit 31, the reception coil unit 32, the rectifying circuit 40 and the load 50 according to the embodiment of the disclosure. As shown in FIG. 4, each of the transmission resonant coil unit 31 and the reception coil part 32 may include an inductor L3 or L4 and a capacitor C3 or C4 having a predetermined inductance value and a predetermined capacitance value, respectively.

The rectifying unit 40 may include a diode D1 and a rectifying capacitor C5 such that the rectifying unit 40 converts AC power into DC power to be output. Although the load 50 is denoted as a 1.3 V DC power source, the load 50 may be a battery or other devices requiring DC power.

Hereinafter, a wireless power transmitter 100 for transmitting energy through a transmission resonance unit corresponding to the position of a wireless power receiver and a method thereof will be described according to the embodiment of the disclosure.

FIG. 5 is view showing the structure of the wireless power transmitter 100 according to one embodiment of the present invention.

Referring to FIG. 5, the wireless power transmitter 100 may include a power supply unit 11, a detection power applying unit 12, a current measuring unit 13, a switch unit 14, a controller 15, a plurality of transmission resonance units 20 and a pad 25. According to the embodiment, the transmission resonance units 20 may be arranged on the pad 25 in the 2D. According to one embodiment, the transmission resonance units 20 may be arranged on the pad 25 in the 2D, so that the transmission resonance units 20 may have the form of a matrix.

Meanwhile, as shown in FIG. 5, each transmission resonance unit 20 may correspond to the power transmission unit of FIG. 1, and remaining components except for the transmission resonance unit 20 may be included in the power source 10 of FIG. 1.

The transmission resonance units 20 correspond to a plurality of resonance frequencies. The transmission resonance units may have the same resonant frequency, or may have different resonant frequencies.

In addition, a portion of the transmission resonance units 20 may have the first resonant frequency, and remaining transmission resonance units 20 may have the second resonant frequency. In this case, the first resonant frequency may differ from the second resonant frequency.

The pad 25 may have a rectangular shape, but the disclosure is not limited thereto.

If a wireless power receiver 60 is located on the pad 25, the wireless power transmitter 100 may transmit energy to the wireless power receiver 60 through a specific transmission resonance unit among the transmission resonance units 20 placed on the pad 25. In this case, the wireless power receiver 60 may include the power reception unit 30, the rectifying circuit 40, and the load 50, which are described with reference to FIG. 1, and may be installed in an electronic device such as a portable terminal.

The power supply unit 11 generates AC power having a specific frequency for the energy transmission purpose, and the AC power may be transmitted to the transmission resonance units 20 through the switch unit 14.

The detection power applying unit 12 may generate detection power used to detect the location of the wireless power receiver 60 and provide the detection power to the switch unit 14. According to one embodiment, the detection power may be a micro-power used to detect the wireless power receiver 60 provided on the pad 25. In this case, if the transmission resonance units 20 have the same resonant frequency, the detection power may be AC power having the same frequency as the resonant frequency.

The current measuring unit 13 measures the internal current generated from the wireless power transmitter 100 by the applied detection power, and the measured current may be supplied to the controller 15. In this case, the controller 15 may detect the location of the wireless power receiver 60 based on the measured current.

Hereinafter, the principle in which the controller 15 detects the location of the wireless power receiver 60 based on the measured current will be described.

In the following description, it is assumed that a transmission resonance coil unit 22 included in each transmission resonance unit 20 has a self resonant frequency f1 due to inductor and capacitor components connected to each other in parallel, and the transmission resonance units 20 have the same self resonant frequency f1.

If the detection power having the resonant frequency f1 is applied to each transmission resonance unit 20, the current measured in the wireless power transmitter 100 is minimized because the inductor and the capacitor of each transmission resonance unit 20 appear in an open state at the self resonant frequency f1, so that impedance is maximized.

If the wireless power receiver 60 approximates the transmission resonance units 20, the inductance component L1 of the transmission resonance unit and the inductance component L2 of the wireless power receiver are coupled with each other, so that the mutual inductance component is defined as following Equation 1.

$$M = k\sqrt{L_1 L_2},\qquad\text{Equation 1}$$

In Equation 1, k represents a coupling coefficient, L1 represents self inductance of the transmission resonance unit 20 corresponding to the location of the wireless power receiver 60, and L2 represents the self inductance of the wireless power receiver 60.

The mutual inductance component M generated between the transmission resonance unit 20 corresponding to the location of the wireless power receiver 60 and the wireless power receiver changes the self resonant frequency f1 of the transmission resonance unit 60 and the wireless power receiver 60, and the changed self resonant frequency is called a mutual-change resonant frequency f2.

In other words, if the wireless power receiver 60 is located on a specific transmission resonance unit 20, the mutual-change resonant frequency f2 may refer to the resonant frequency changed between mutual inductance components of the specific transmission resonance unit 20 and the wireless power receiver 60.

The inductor and the capacitor of the transmission resonance unit 20 corresponding to the location of the wireless power receiver 60 do not have the maximum impedance value at the mutual-change resonant frequency f2. Accordingly, if the detection power having the self resonant frequency f1 is applied to the transmission resonance unit 20 close to the wireless power receiver 60, the current measured in the wireless power transmitter 100 is increased.

In addition, as the wireless power receiver 60 more closely approximates the specific transmission resonance unit 20, the mutual-change resonant frequency f2 or the current measured in the wireless power transmitter 100 is gradually increased. The controller 15 determines if the wireless power receiver 60 approximates the specific transmission resonance unit 20 based on the variation in the mutual-change resonant frequency f2 or the current.

The switch unit 14 performs a switching operation in order to sequentially supply the detection power, which is received from the detection power applying unit 12, to the transmission resonance units 20. In other words, the switch unit 14 sequentially supplies the detection power to the transmission resonance units 20 according to the control of the controller 15, so that the location of the wireless power receiver 60 can be detected.

In addition, the switch unit 14 may perform the switching operation in such a manner that the power generated from the power supply unit 11 is supplied to the specific transmission resonance unit 20. In other words, the switch unit 14 performs the switching operation in such a manner that the power is supplied to the transmission resonance unit 20 corresponding to the location of the wireless power receiver 60 and not supplied to remaining transmission resonance units 20.

The transmission resonance units 20 may be arranged in the form of a lattice or a matrix on the pad 25. In other words, the transmission resonance units 20 may be arranged in such a manner that the area of the pad 25 is divided into a plurality of uniform areas.

In addition, the transmission resonance units 20 have the same shape and the same size, but the present invention is not limited thereto. Meanwhile, although the total 12 transmission resonance units 20 are provided in the form of a lattice according to the present embodiment, the disclosure is not limited thereto.

In addition, each transmission resonance unit 20 includes a transmission coil unit 21 and a transmission resonance coil unit 22.

The transmission coil unit 21 is connected to the switch unit 14, and has AC current flowing therein to generate a magnetic field. In addition, the transmission coil unit 21 transmits the magnetic field to the transmission resonance coil unit 22, which is physically spaced apart from the transmission coil unit 21, through the electromagnetic induction phenomenon.

If the transmission resonance coil unit 22 receives the magnetic field from the transmission coil unit 21, AC current is induced into the transmission resonance coil unit 22. In addition, the transmission resonance coil unit 22 supplies the energy stored therein to the wireless power receiver 60 through the resonance phenomenon. In this case, for the purpose of the wireless power transmission by the resonance, the self resonant frequency of the transmission resonance coil unit 22 must be matched with the self resonant frequency of the reception resonance coil unit (not shown) provided in the wireless power receiver 60.

The transmission resonance coil unit 22 includes a capacitor 22a, and the capacitor 2a may be a fixed capacitor having fixed capacitance or a variable capacitor having variable capacitance.

If the capacitor 22a of the transmission resonance coil unit 22 is the variable capacitor, the controller 15 may adjust the resonant frequency by changing the capacitance of the capacitor 22a of the transmission resonance coil unit 22.

For example, on the assumption that the wireless power receiver 60 has a fixed self resonant frequency, the wireless power transmitter 100 may adjust the capacitance of the variable capacitor 22a of the transmission resonance coil unit 22 to have the resonant frequency equal to that of the wireless power receiver 60. In this case, the controller 15 may previously store the information of the resonant frequency of the wireless power receiver 60.

Meanwhile, if the capacitor 22a of the transmission resonance coil unit 22 is a fixed capacitor, the capacitance of the capacitor 22a may be preset to the extent that the resonant frequency of the transmission resonance coil unit 22 is equal to that of the wireless power receiver 60.

The controller 15 may control the overall operation of the wireless power transmitter 100.

The controller 15 may perform a control operation to transmit power to the wireless power receiver 60 through the specific transmission resonance unit 20 corresponding to the location of the wireless power receiver 60 existing on the pad 25.

For example, as shown in FIG. 5, the transmission resonance units 20 may be arranged in a 3×4 matrix with three rows and four columns, and the wireless power receiver 60 may be located on the transmission resonance units 20 provided in the second row and first column, the second row and second column, the third row and the first column, and the third row and the second column.

In this case, the controller 15 controls the switch unit 14 to transmit power to the wireless power receiver 60 only through the transmission resonance units 20 provided at positions of the second row and first column, the second row and second column, the third row and the first column, and the third row and the second column.

In addition, the controller 15 may perform the control operation such that power is transmitted to the wireless power receiver 60 only through the transmission resonance unit 20, which is provided at a position of the second row and second column, most greatly overlapped with the wireless power receiver 60.

Through the above procedure, the wireless power transmitter 100 can concentrate energy transmission on the wireless power receiver 60 through the transmission resonance unit 20 corresponding to the location of the transmission resonance unit 20. Accordingly, unnecessary power consumption may be inhibited.

Meanwhile, the controller 15 may previously store mutual-change resonant frequency values according to the measured current in the form of a look-up table. Through the look-up table, the controller 15 can detect the mutual-change resonant frequency f2 based on the detected current from a current measuring unit 13, and may control the power supply unit 11 so that the power supply unit 11 generates AC power having the mutual-change resonant frequency f2.

In addition, the controller 15 sequentially controls the transmission resonance units 20 while monitoring the information of the current supplied from the current measuring unit 13. In addition, the controller 15 may detect the location of the wireless power receiver 60 on the pad 25 based on the information of the current.

For example, the controller 15 applies the detection power having the self resonant frequency f1 to the transmission resonance unit 20 provided at the position of the first row and first column through the control of the switch unit 14. Then, if receiving the information of the current from the current measuring unit 13, the controller 15 recognizes the wireless power receiver 60 existing on the transmission resonance unit 20 provided at the position of the first row and first column.

The controller 15 sequentially performs the above procedure with respect to each transmission resonance unit 20 to determine if the wireless power receiver 60 exists on a region of the pad 25 in which the related transmission resonance unit 20 is located.

In addition, the controller 15 may previously set a threshold value in order to determine a region, in which the wireless power receiver is located, among regions corresponding to the transmission resonance units 20. If the wireless power receiver 60 is located on a plurality of regions, the variation in the quantity of current may be detected in all of the transmission resonance units 20 provided throughout the regions.

The controller 15 may determine the transmission coil unit located at a region most greatly overlapped with the wireless power receiver by setting the threshold value. Therefore, the controller 15 may determine that the wireless power receiver 60 is located on the related transmission resonance unit 20 only if the current received from the current measuring unit 13 exceeds the preset threshold value.

If the location of the wireless power receiver 60 has been completely detected, the controller 15 transmits energy through the transmission resonance unit 20 corresponding to the location of the wireless power receiver 60. In other words, the controller 15 supplies AC power generated from the power supply unit 11 to the related transmission resonance unit 20 through the control of the switch unit 14.

The wireless power transmitter 100 generates AC power having the mutual-change resonant frequency f2 through the power supply unit 11 to transmit energy through the transmission resonance unit 20 corresponding to the location of the wireless power receiver 60. In other words, the actual energy transmission is achieved with the mutual-change resonant frequency f2 instead of the self resonant frequency ft. In this case, the controller 15 may control the power supply unit 11 such that the AC power having the mutual-change resonant frequency f2 is generated.

Meanwhile, although the wireless power transmitter 100 detects the location of the wireless power receiver 60 through the variation in the quantity of current according to the present embodiment, the disclosure is not limited thereto. In other words, the wireless power transmitter 100 may detect the location of the wireless power receiver 60 by using a pressure sensor located on the pad 25 instead of the detecting scheme based on the variation in the quantity of the current.

As described above, according to the embodiment of the disclosure, the wireless power transmitter 100 transmits energy through the specific transmission resonance unit 20 corresponding to the location of the wireless power receiver 60 existing on the pad 25, thereby improving energy transmission efficiency to the wireless power receiver 60.

FIG. 6 is a flowchart showing a method of transmitting power by the wireless power transmitter 100 according to one embodiment of the disclosure.

Hereinafter, the method of transmitting power by the wireless power transmitter 100 according to one embodiment of the disclosure will be described by making reference to the description of FIG. 5.

Referring to FIG. 6, the wireless power transmitter 100 sequentially applies the detection power to a plurality of transmission resonance units 20 (step S101). According to one embodiment, the wireless power transmitter 100 controls the switch unit 14 to sequentially apply the detection power to the transmission resonance units 20. According to one embodiment, the detection power may refer to the AC power having a frequency corresponding to the self resonant frequency f1 of the transmission resonance unit 20.

Thereafter, the wireless power transmitter 100 measures internal current based on the detection power (step S103). According to one embodiment, the internal current of the wireless power transmitter 100 may be current output from the power supply unit 11, but the disclosure is not limited thereto.

The measured current may be varied according to the impedance characteristic of the transmission resonance unit 20. In more detail, if the detection power having the frequency corresponding to the resonant frequency f1 is applied to the transmission resonance unit 20, the impedance of the wireless power transmitter 100 is most greatly increased, so that the measured current is minimized. If the detection power having the frequency different from the resonant frequency 11 is applied to the transmission resonance unit 20, the impedance of the wireless power transmitter 100 is decreased, so that the measured current is increased.

Thereafter, the wireless power transmitter 100 determines if the measured current exceeds the threshold value step S105). According to one embodiment, the threshold value may refer to the minimum current value required to detect the wireless power receiver located on the transmission resonance units 20. In other words, if the measured current is equal to or greater than the threshold value, the wireless power receiver 60 may be determined as being located on the specific transmission resonance unit 20.

If the measured current value is equal to or greater than the threshold value, the wireless power transmitter 100 determines that the wireless power receiver 60 is located on the specific transmission resonance unit 20 (step S107). In other words, if the wireless power receiver 60 is located on the specific transmission resonance unit 20, the resonant frequency of the transmission resonance unit 20 corresponding to the location of the wireless power receiver 60 is changed into the mutual-change resonant frequency f2, which has been described with reference to FIG. 5, due to the mutual inductance component. In addition, since the detection power having the frequency different from the resonant frequency f1 is applied to the transmission resonance unit 20 corresponding to the location of the wireless power receiver 60, the measured current may have a current value equal to or greater than the threshold value.

Thereafter, the wireless power transmitter 100 determines the transmission resonance unit 20 corresponding to the location of the detected wireless power receiver 60 as the transmission resonance unit for power transmission (step S109). According to one embodiment, the wireless power transmitter 100 may determine the transmission resonance unit 20 corresponding to the location of the wireless power receiver 60 among the transmission resonance units 20. For example, as shown in FIG. 5, if the wireless power receiver 60 is located on the transmission resonance units 20 provided at positions of the second row and first column, the second row and second column, the third row and first column, and the third row and second column, the wireless power transmitter 100 may determine only the transmission resonance units 20, which are provided at positions of the second row and first column, the second row and second column, the third row and first column, and the third row and second column, as the transmission resonance units 20 for the power transmission to the wireless power receiver 60.

According to another embodiment, the wireless power transmitter 100 may determine only the transmission resonance unit 20 provided at the position of the second row and second column most greatly overlapped with the wireless power receiver 60 as the transmission resonance unit 20 for the power transmission.

Thereafter, the wireless power transmitter 100 transmits power through the determined transmission resonance unit 20 (step S111). According to one embodiment, the wireless power transmitter 100 controls the switch unit 14 to transmit power to the wireless power receiver 60 through the determined transmission resonance unit 20.

As described above, according to the embodiment of the disclosure, the wireless power transmitter 100 transmits energy through the transmission resonance unit 20 corresponding to the location of the wireless power receiver 60, thereby improving the power transmission efficiency.

In addition, the wireless power transmitter 100 concentrates the energy transmission through a specific transmission resonance unit 20, thereby reducing energy consumption, and reducing a magnetic field harmful to the human body.

Although embodiments have been described with reference to a number of illustrative embodiments thereof it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power transmitter for wirelessly transmitting power to a wireless power receiver, the wireless power transmitter comprising:
   a plurality of transmission resonance coils, each having a resonance frequency identical to that of the wireless power receiver;
   a power supply unit;
   a detection power applying unit;
   a measuring unit;
   a switch unit connected to the plurality of transmission resonance coils; and
   a controller configured:
   to control the detection power applying unit and the switch unit to sequentially supply a detection power having a first frequency to each of the plurality of transmission resonance coils, the first frequency being identical to the resonance frequency of each of the transmission resonance coils,
   to control the measuring unit to measure a value of a current of each of the transmission resonance coils,
   to compare the measured current value of each of the transmission resonance coils to a threshold current value,
   to determine whether a location of at least one transmission resonance coil of the plurality of transmission resonance coils corresponds to a location of the wireless power receiver based on whether the measured current values of the transmission resonance coils are equal to or greater than the threshold current value, and
   to control the power supply unit and the switch unit to supply a charging power having a second frequency to the determined at least one transmission resonance coil for charging of the wireless power receiver, the second frequency being a mutual-change resonance frequency changed from a resonance frequency due to a mutual inductance component between the respective transmission resonance coil and the wireless power receiver, the at least one transmission resonance coil being determined according to whether the measured current values are equal to or greater than the threshold current value, wherein each of the plurality of transmission resonance coils comprises a variable capacitor for changing the resonance frequency of the transmission resonance coils, wherein the threshold value is a minimum current value required to detect the wireless power receiver location, wherein the plurality of transmission resonance coils is disposed on a pad in which the plurality of transmission resonance coils is divided and arranged in regions having an equal area, and wherein the switch unit is disposed outside the pad.

2. The wireless power transmitter of claim 1, wherein the second frequency is different from the first frequency and the at least one of the plurality of transmission resonance coils having a location corresponding to a location of the wireless power receiver transmits the charging power having the second frequency to the wireless power receiver.

3. The wireless power transmitter of claim 2, wherein the second frequency is related to a frequency for receiving of the wireless power receiver.

4. The wireless power transmitter of claim 1, wherein the threshold current value is a previously determined current value.

5. The wireless power transmitter of claim 1, wherein the plurality of transmission resonance coils are spatially arranged across the pad.

6. The wireless power transmitter of claim 5, wherein the plurality of transmission resonance coils are arranged in a form of a lattice or a matrix.

7. A method of a wireless power transmitter for wirelessly transmitting power to a wireless power receiver to detect and charge the wireless power receiver, comprising:
sequentially applying a detection power having a first frequency to each of a plurality of transmission resonance coils, each of the plurality of transmission resonance coils having a resonance frequency identical to that of the wireless power receiver, and the first frequency being identical to the resonance frequency of each of the transmission resonance coils;
measuring a value of a current of each of the transmission resonance coils;
comparing the measured current value of each of the transmission resonance coils to a threshold current value; and
determining whether a location of at least one transmission resonance coil of the plurality of transmission resonance coils corresponds to a location of the wireless power receiver, based on whether the measured current values of the transmission resonance coils are equal to or greater than the threshold current value; and
supplying a charging power having a second frequency to the determined at least one transmission resonance coil for charging of the wireless power receiver, the second frequency being a mutual-change resonance frequency changed from a resonance frequency due to a mutual inductance component between the respective transmission resonance coil and the wireless power receiver, the at least one transmission resonance coil being determined according to whether the measured current values are equal to or greater than the threshold current value, wherein each of the plurality of transmission resonance coils comprises a variable capacitor for changing a resonance frequency of the transmission resonance coils, wherein a power having the second frequency for charging of the wireless power receiver is applied, wherein an impedance variance is generated by the wireless power receiver, wherein the second frequency is applied to the at least one of the plurality of transmission resonance coils having a location corresponding to the location of the wireless power receiver after the first frequency is applied, and wherein the plurality of transmission resonance coils is disposed on a pad in which the plurality of transmission resonance coils is divided and arranged in regions having an equal area.

8. The method of claim 7, wherein the second frequency is related to a frequency for receiving of the wireless power receiver.

9. The method of claim 7, wherein the threshold current value is a minimum current value required to detect the wireless power receiver location.

10. The method of claim 7, further comprising repeatedly measuring the current value based on the impedance variance of each of the plurality of transmission resonance coils.

* * * * *